April 27, 1954     W. BENNETT     2,676,815
LONGITUDINALLY ADJUSTABLE RUNNING GEAR FOR VEHICLES
Filed Dec. 7, 1951     3 Sheets-Sheet 1
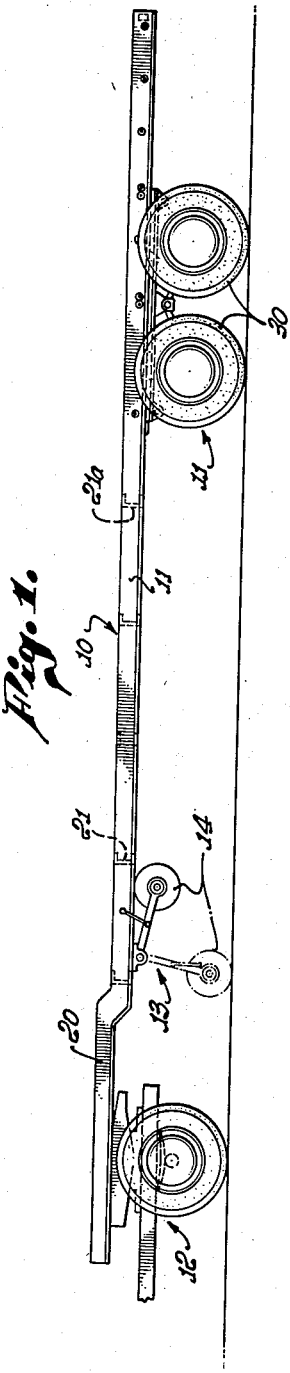
WALTER BENNETT,
INVENTOR.
BY
ATTORNEYS.

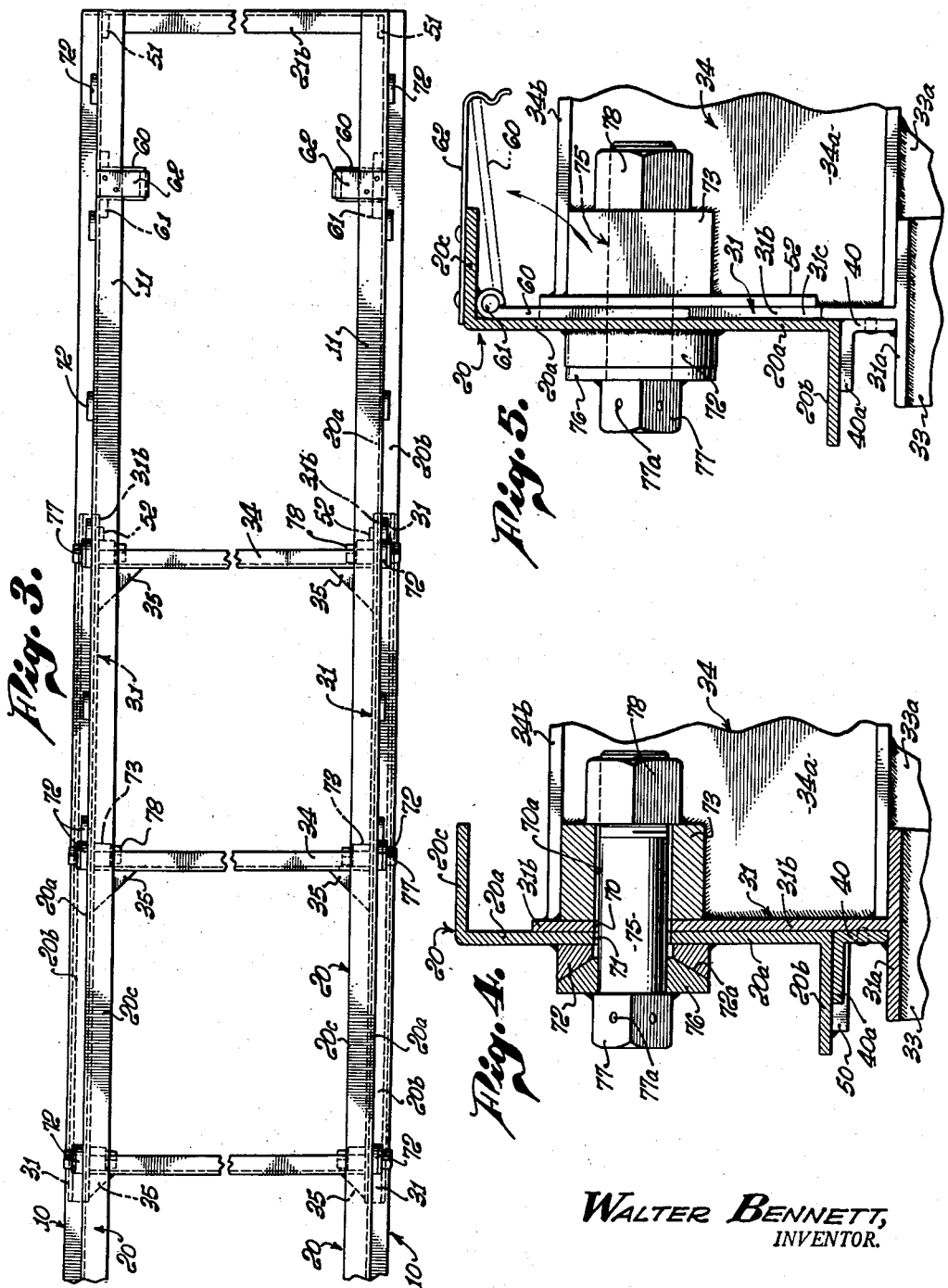

April 27, 1954     W. BENNETT     2,676,815
LONGITUDINALLY ADJUSTABLE RUNNING GEAR FOR VEHICLES
Filed Dec. 7, 1951     3 Sheets-Sheet 3
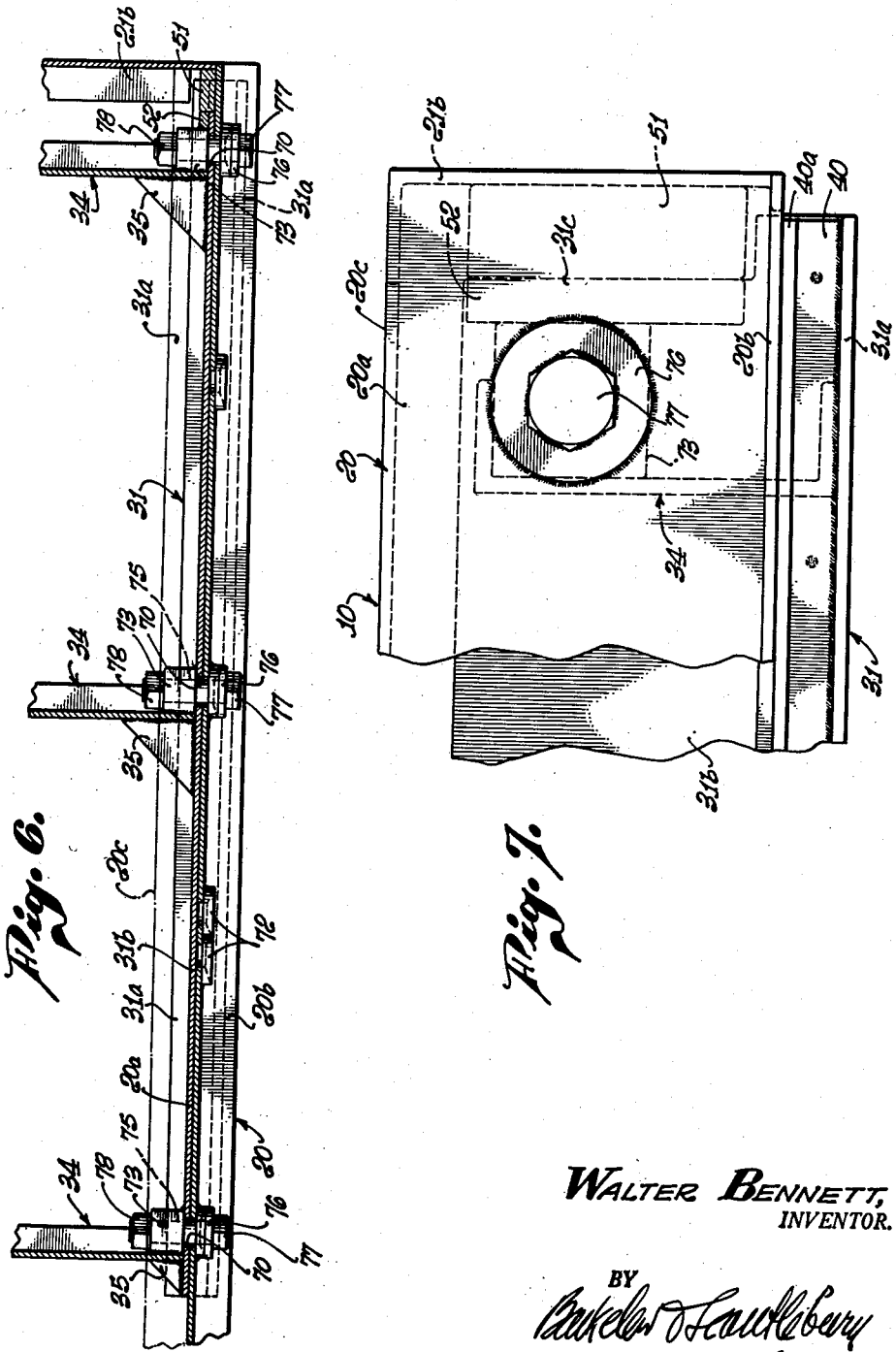
WALTER BENNETT,
INVENTOR.

Patented Apr. 27, 1954

2,676,815

UNITED STATES PATENT OFFICE 2,676,815

LONGITUDINALLY ADJUSTABLE RUNNING GEAR FOR VEHICLES

Walter Bennett, Los Angeles, Calif., assignor to Utility Trailer Manufacturing Company, Los Angeles, Calif., a corporation of California Application December 7, 1951, Serial No. 260,455

8 Claims. (Cl. 280—81)

This invention has to do with the shifting of vehicular running gear longitudinally with respect to the load carrying body or frame. A preferred form of the invention is here shown and described as applied to a semi-trailer, but the invention, as will be readily recognized, may be applied to any type of load carrying vehicle.

It is often desirable, in freight vehicles to be able to change the relative longitudinal position of the running gear under the load carrying frame, to effect some particular, for instance some more equable, distribution of the load between the front and rear road wheels. Specifically as an example, in a semi-trailer it may be desirable to effect equable load distribution between the wheels of the trailer's rear running gear and the rear running gear of the tractor; or on the other hand, to distribute a greater portion of the load onto the rear gear of the tractor to increase traction. Or it may be desirable to adjust the load distribution, as between the rear running gear and the forward temporary support of a semi-trailer, when the trailer is detached from its tractor.

The invention provides for longitudinal adjustment and setting of a running gear in two or more relative positions, and, in a very simple structure for rigidly and solidly incorporating the gear with the vehicle frame in each of the several positions.

The invention, its objects and accomplishments, will be understood from the specific illustrative form described in the following and shown in the accompanying drawings, where:

Fig. 1 is a side elevation showing a typical semi-trailer equipped with adjustable rear running gear according to the invention;

Fig. 2 is an enlargment of the rear portion of the trailer shown in Fig. 1;

Fig. 3 is a plan, compressed in width of the frame parts shown in Fig. 2;

Figs. 4 and 5 are further enlarged sections on lines 4—4 and 5—5 of Fig. 2;

Fig. 6 is an enlarged detail section on line 6—6 of Fig. 2, showing the parts in the relative positions assumed when the running gear and its sub-frame are in the rear-most position; and Fig. 7 is an enlarged elevation showing the rear parts of Fig. 6.

Fig. 1 shows a typical semi-trailer with its main frame 10 supported at rear on rear running gear 11 and at its front end on a tractor 12 in typical manner. Such semi-trailers usually are provided with gear for supporting their front ends when detached from the tractor, such a support being indicated generally at 13, comprising a wheel or pair of wheels 14 which may be lowered, as indicated, to support the front end. On a semi-trailer, one of the effects of shifting the longitudinal position of the rear running gear may be to adjust the load distribution between that gear and the front support when the trailer is detached from the tractor.

Main trailer frame 10 is typically composed of two side longitudinal beams 20 and cross members 21. Such frame cross members 21 are usually provided in the rear portion as well as in the forward portion of the frame; but in the present design the function of such cross members in the rear portion of the frame is taken over by cross members in the longitudinally movable sub-frame, as will be explained. So, in Fig. 1 there are no main frame cross members 21 to the rear of the one shown at 21a; except that there may be a rear end cross member of the main frame, as shown at 21b in Figs. 2 and 3.

As best shown in Figs. 2, 4 and 5 the wheels 30 of rear running gear 11 are mounted on the longitudinals 31 of a slidable sub-frame, through springs 32 and the spring shackles 33. The sub-frame comprises two side longitudinals 31 and a series of cross members 34 (shown here as three) welded to the longitudinals and braced by welded corner gussets 35. As shown in Figs. 2 and 3, the spring shackles 33 are aligned with the several cross members 34; and as shown in Figs. 4 and 5, the shackles, directly mounted on the under side of sub-frame flange 31a, are braced by gussets 33a to the cross members. The details of structure at the two opposite sides of the main frame and sub-frame are identical so a detailed explanation of the structures at one side will suffice.

As shown best in Figs. 4 and 5, the longitudinals 20 of the main frame are formed of beam sections with a vertical web 20a, an outwardly turned lower flange 20b and, preferably, also an upper inwardly turned flange 20c; thus either having a flange only at the bottom or, preferably, also one at the top. The longitudinal members 31 of the sliding sub-frame are preferably of inverted T-section, with the T flange 31a at the lower edge of a vertical web 31b. The two parallel longitudinals 31 are rigidly connected by the gussetted cross members 34 and are by them so spaced apart that the webs 31b fit closely, but slidably, face to face, with the inner faces of webs 20a of main frame longitudinals 20, as shown in Figs. 4 and 5. To transmit the load thrust from the main frame to the sub-frame, longitudinal angles 40 are welded to sub-frame longitudinals 31, with one flange 40a projecting out horizontally under the lower flange 20b of main frame member 20 to slide thereunder. The height of the main frame with respect to the running gear (which directly carries the sub-frame) can easily be adjustably set by changing the relative elevation at which longitudinal angles 40 are welded to sub-frame longitudinals 31. In Figs. 4 and 5 they are shown in relative position to support the main frame at the lowest relative level.

In the typical structure shown in the drawings the sub-frame and running gear can be set in three different positions. In Fig. 2 the first or forward position is shown in full lines; the second or intermediate position is indicated by the center line for second position and by the broken line showing of the rear one of the pair of wheels; and the third or rear position is similarly indicated. The sub-frame may be moved into its forward position from any position to the rear of that, by blocking or braking the rear running gear wheels and then moving the main frame back by tractor action, until the forward ends of sub-frame longitudinal angles 40 come up against stop lugs 50 (see Figs. 2 and 4) welded or otherwise secured to the under faces of flanges 20b of main frame members 20. From that position, the sub-frame and running gear may be moved to either the intermediate or rear position by tractor action pulling the main frame forward with the wheels blocked or braked. In the rear position, the rear ends (see Figs. 6 and 7) of the sub-frame longitudinals 31 (their webs 31b) move back against stop lugs 51 welded or otherwise secured to the inner faces of webs 20a of main frame members 20. The upper part of the rear end of web 31b is cut back to present an end edge at 31c; and that edge is effectively thickened for withstanding impact by a block or bar 52 welded to the inner face of web 31b.

In the second or intermediate position the same rear end edge of the longitudinal 31 moves back against a stop plate 60 which in its stop position hangs vertically, from hinge pin 61, inside the web 20a of main frame longitudinal 20. See Figs. 2 and 5. To allow the sub-frame to pass the intermediate position to reach the rear position, stop plate 60 is hung up in the position shown in broken lines in Fig. 5 by any suitable means, for instance the spring catch 62.

In each of its several positions the sub-frame is directly and solidly clamped to the main frame longitudinals, so that the sub-frame becomes for all functional purposes an integral part of the main frame, the sub-frame cross members then performing the same main frame stiffening function for the rear portion of that frame that the fixed cross members 21 do for the forward portion. The preferred means for effecting that solid clamping is a set of clamping bolts arranged preferably as shown in the drawings.

As shown best in Fig. 6, the webs 31b of sub-frame longitudinals 31 are provided with three bolting holes 70 spaced apart longitudinally, and each immediately adjacent one of the three frame cross members 34. Those three bolting holes in 31b are thus, together with the associated cross members, located directly above the three spring shackle blocks 33. The webs 20a of main frame longitudinals 20 have a series of bolting holes 71, located in the several positions designated 71A in Fig. 2, and three of which register with the three bolting holes in the sub-frame longitudinal in the several positions of the sub-frame. The details of structure at the several registrable bolting holes are best shown in Figs. 4, 5 and 6.

At each main frame bolting hole 71, there is a washer-like member 72 with a concave, conical, outer face 72a, welded to the outer face of web 20a. At each sub-frame bolting hole 70, there is a heavy reinforcing block 73 welded in the corner which is formed at the inner face of web 31b by the web 34a and upper flange 34b of the associated cross member 34. Bolting holes 70 are extended, at 70a, through the blocks 73.

With the sub-frame in any of its several adjusted positions, clamping bolts 75 are set in each of the sets of three registering bolting holes. As shown in Fig. 4, each bolt has a heavy conical washer 76 under its outer head 77, preferably welded to it and thus forming in effect a part of a conical head that fits in the conical outer face 72a of washer 72. The inner end of bolt 75 is provided with nut 78; but instead of leaving that nut free it is preferably welded to block 73 and the bolt is set up by turning it in the stationary nut. Bolt head 77 may be provided with any suitable means to prevent the bolt from backing out from its set-up position. Such means are well known and so are not shown, but may for instance involve cotter pin holes 77a in the bolt head. When the bolts are set up tightly the two webs 20a and 31b are drawn into tight facial contact with each other and the two webs locked together against any relative longitudinal, or vertical, movement. With the two webs locked together, and particularly with the longitudinal flange 40a bearing up under the main frame longitudinal, the sub-frame longitudinals effectively reinforce the main frame in the region where it may most need reinforcement—directly over the running gear support. And also when the two webs are locked together the sub-frame cross members then perform the function of stiffening and bracing the main frame. With relation to those reinforcing and stiffening functions it will be noted by reference to Figs. 4 and 5 that the vertical webs 31b of the sub-frame longitudinals are vertically co-extensive with a major portion of the vertical extent of the main longitudinal webs 20a; and that, likewise, the vertical extents of the cross members 34 are co-extensive with a major portion of the vertical extent of the sub-frame longitudinal webs 31b. When the two webs are locked together, the effect then is as if the cross members, lying substantially in the horizontal planes of the main longitudinals, were directly rigidly connected to those longitudinals.

The interengaging conical members 72, 76 have the effect of allowing for slight discrepancies in exact registration of bolting holes 70 and 71. Those holes, and also 70a and the hole through washer 72 can be drilled somewhat over-size, and the seating of 76 in 72 with the bolts tightly set then holds the two webs rigidly together with no liability of relative movement along their plane of contact.

I claim:

1. In combination, a vehicle main frame embodying side longitudinal beams having vertical webs and outwardly turned flanges along their lower edges, a rigid load-supporting sub-frame embodying side longitudinal beams and cross members extending directly transversely between and rigidly connected to the longitudinal beams, the longitudinal beams of the sub-frame embodying vertical webs lying inside the main longitudinal webs and in close slidable facial contact with the inner faces of the main longitudinal webs, the vertical webs of the sub-frame longitudinal beams being vertically co-extensive with a major portion of the vertical extent of the webs of the main longitudinal beams, and the cross members having vertical extents co-extensive with a major portion of the vertical extent of the webs of the sub-frame longitudinal beams, said sub-frame longitudinal beams having near their lower edges upwardly facing and outwardly extending longitudinal flanges bearing upwardly against the under faces of the flanges of the main longitudinal beams, and means for positively clamping the facially engaging webs together in tight facial engagement selectively in a plurality of longitudinally spaced relative positions, whereby, when said webs are so clamped, the transverse cross members of the sub-frame form fully effective transverse cross members for the main frame rigidly associated with its longitudinal beams.

2. The combination defined in claim 1, and in which the sub-frame webs are provided with a set of longitudinally spaced bolt holes and the main frame webs are provided with a plurality of longitudinally spaced sets of bolt holes registrable with the first mentioned sets in different relative longitudinal positions of the sub-frame, and including clamping bolts extending through the registering bolt holes.

3. The combinations defined in claim 2, and also including bored reinforcing blocks secured integrally to the inner faces of the sub-frame webs in register with their bolt holes, outer reinforcing washers integrally secured to the outer faces of the main frame webs in alignment with their bolt holes and having outer concave surfaces, and the bolts having heads with inwardly facing convex surfaces seating in said concave washer surfaces.

4. The combination defined in claim 1, and wherein the support of the sub-frame longitudinal beams on the running gear embodies spring shackle blocks secured directly to the lower edges of said sub-frame beams in longitudinally spaced relation, and wherein the sub-frame cross members are located directly above said shackle blocks.

5. The combination defined in claim 4, and wherein the sub-frame webs are provided with a set of longitudinally spaced bolt holes each directly over a spring shackle block and each in close proximity to a cross member, and the main frame webs are provided with a plurality of longitudinally spaced sets of bolt holes registrable with the first mentioned sets in different relative longitudinal positions of the sub-frame, and including bored reinforcing blocks integrated with the inner faces of the sub-frame webs in alignment with the bolt holes and also integrated with the adjacent cross-members, and clamping bolts extending through the bored reinforcing blocks and the registering bolt holes.

6. The combination defined in claim 1, and in which the sub-frame longitudinal beams are of inverted T-section, the support of said beams on the running gear including spring shackle blocks directly secured to the under face of the T-section flanges, and in which the upwardly facing flange of the sub-frame beam is formed by an outwardly extending flange of an angle-section integrated with the web of the sub-frame beam above its lower T-flange.

7. The combination defined in claim 1, and including two stops rigidly attached to the main frame longitudinal beams and adapted to be engaged by the ends of the sub-frame longitudinal beams in their extreme longitudinally spaced relative positions, and an intermediate position stop mounted on the main frame and adapted to be moved into and out of a position engageable by an end of a sub-frame longitudinal beam.

8. The combination defined in claim 1, and wherein the sub-frame webs are provided with a set of longitudinally spaced bolt holes each in close proximity to a cross member, and the main frame webs are provided with a plurality of longitudinally spaced sets of bolt holes registrable with the first mentioned sets in different relative longitudinal positions of the sub-frame, and including bored reinforcing blocks integrated with the inner faces of the sub-frame webs in alignment with the bolt holes and also integrated with the adjacent cross-members, and clamping bolts extending through the bored reinforcing blocks and the registering bolt holes.

References Cited in the file of this patent
UNITED STATES PATENTS

| Number | Name | Date |
| --- | --- | --- |
| 1,621,555 | Miller | Mar. 22, 1927 |
| 2,589,678 | De Lay | Mar. 18, 1952 |